United States Patent [19]

Termine et al.

[11] Patent Number: 4,511,688

[45] Date of Patent: Apr. 16, 1985

[54] FLAME RETARDANT FOR USE IN RIGID POLYURETHANE FOAMS

[75] Inventors: Enrico J. Termine, Pembroke Pines, Fla.; Sally P. Ginter, Sanford, Mich.

[73] Assignee: The Dow Chemical Company, Midland, Mich.

[21] Appl. No.: 584,577

[22] Filed: Feb. 29, 1984

[51] Int. Cl.³ .............................................. C08G 18/14
[52] U.S. Cl. ................................. 524/380; 252/609; 521/171
[58] Field of Search ........................ 524/380; 252/609; 521/171

[56] References Cited

U.S. PATENT DOCUMENTS

| | | | |
|---|---|---|---|
| 3,226,368 | 4/1966 | Reischl et al. | 528/51 |
| 3,252,922 | 5/1966 | Degener et al. | 521/171 |
| 3,502,601 | 4/1970 | Case et al. | 521/172 |
| 3,507,933 | 4/1970 | Larsen et al. | 525/40 |
| 3,513,113 | 5/1970 | Praetzel et al. | 521/189 |
| 3,542,740 | 11/1970 | Pumpelly et al. | 528/49 |
| 3,607,953 | 9/1971 | Hurley | 568/676 |
| 3,637,543 | 1/1972 | Kus et al. | 521/131 |
| 3,779,953 | 12/1973 | Papa et al. | 521/171 |
| 3,933,693 | 1/1976 | Priest | 521/160 |
| 3,981,827 | 9/1976 | Papa et al. | 521/115 |
| 4,052,346 | 10/1977 | Rudnen et al. | 521/112 |
| 4,053,439 | 10/1977 | Chlystek | 521/99 |
| 4,194,068 | 3/1980 | Miller et al. | 521/107 |
| 4,209,609 | 6/1980 | Haas | 528/421 |
| 4,223,068 | 9/1980 | Carlstrom et al. | 521/171 |
| 4,260,717 | 4/1981 | Ehrhart | 528/59 |
| 4,264,745 | 4/1981 | Foucht | 521/107 |
| 4,275,171 | 6/1981 | Wegner | 521/107 |
| 4,302,551 | 11/1981 | Horn et al. | 521/163 |
| 4,363,882 | 12/1982 | Wegner | 521/107 |

OTHER PUBLICATIONS

Bulletin OR-255, Hercules, Inc., Wilmington, Delaware, 8/76.
Reymore et al., *The Journal of Cellular Plastics*, vol. 14, No. 6, pp. 332-340, 1978, (*Chemical Abstracts*, 90:104721k).
Derwent, 51936s, 5/72.
Termine, Enrico J. et al., *Journal of Fire Retardant Chemistry*, "The Effect of Brominated Pentaerythritol and Polyester Polyols on Flammability, Properties and Processing of Some Conventional Rigid Polyurethane Foams", vol. 9, pp. 221-231, Sep. 20, 1983.

*Primary Examiner*—Maurice J. Welsh
*Attorney, Agent, or Firm*—Paul D. Hayhurst

[57] ABSTRACT

Novel flame retardant compositions, which are useful in the preparation of rigid polyurethane foams, comprise a sucrose polyol, an aromatic polyester polyol, and a brominated, hydroxyl-containing pentaerythritol.

18 Claims, No Drawings

FLAME RETARDANT FOR USE IN RIGID POLYURETHANE FOAMS

BACKGROUND OF THE INVENTION

This invention relates to a polyol composition and to rigid polyurethane foams prepared therefrom. More specifically, the invention relates to a flame retardant, halogen-containing polyol composition.

Long standing technical concerns and recent changes in the flame retardant market as related to rigid polyurethane foams have generated a need for new products that will enable the producers of polyurethane foam to meet stringent municipal building codes and insurance company fire regulations. Historically, several approaches have been taken to reduce flammability of rigid polyurethane foams. These approaches fall into two main categories: (1) the use of polyurethane-modified isocyanurates which require minimal levels of flame retardants, and (2) the use of rigid polyurethanes, which require relatively higher levels of flame retardant materials. Each approach has been applied successfully to specific applications, but both suffer from processing constraints and/or shortcomings in foam physical properties. The major advantage realized from polyurethane-modified isocyanurate technology is that foams prepared by this method have inherent thermal stability and can easily pass ASTM E-84 requirements. However, a major disadvantage associated with the use of polyurethane-modified isocyanurates is that large exotherms are produced causing fast reactivities which lead to processing difficulties. For rigid polyurethanes, reactive and additive flame retardants (bromine; chlorine; and phosphorus-containing compounds are most common) are used for pour-in-place, spray, and, to a lesser extent, boardstock applications. Of these two types of flame retardants, reactive compounds generally are preferred because they are nonfugitive after incorporation into the foam.

The most commonly used reactive flame retardant product was THERMOLIN RF-230 chlorinated polyol. Formulations with RF-230 flame retardant retained normal processing characteristics of conventional urethanes, did not require phosphorus additives, produced foam with adequate physical properties, and achieved low flame spread and smoke ratings. An example of the use of RF-230 is disclosed in U.S. Pat. No. 4,223,068. Unfortunately, RF-230 flame retardant was withdrawn from the market. The removal of this product has created a need for a replacement flame retardant in the rigid polyurethane market, especially for pour-in-place panel applications.

In general, halogenated flame retardants tend to be solids or high viscosity liquids. Polyurethane foamers generally do not have solids handling capability and can only manipulate high viscosity products with difficulty, hence foamers actively seek new reactive flame retardant products which are low viscosity liquids that can be easily incorporated into their current processing equipment. Thus, a reactive flame retardant product that produces ASTM E-84 rated foam with good physical properties and without adverse processing constraints is needed for the rigid polyurethane industry.

SUMMARY OF THE INVENTION

The present invention is a novel, low viscosity, reactive flame retardant polyol composition comprising:

(a) a sucrose polyol;
(b) an aromatic polyester polyol; and
(c) an amount of a halogenated, hydroxyl-containing derivative of pentaerythritol which is sufficient to impart a degree of flame retardancy to a rigid polyurethane foam prepared using said composition, such that the polyurethane can achieve a Class I or Class II rating according to the ASTM E-84 test of the American Society for Testing and Materials (hereinafter "ASTM") for determining surface burning characteristics of building materials. The rigid foams produced with the polyol composition of the present invention are useful in many applications including, for example, in pour-in-place panels which are used for commercial coolers, walk-in freezers, refrigerators, and the like. Surprisingly, polyurethane-containing rigid foams prepared using said compositions do not require phosphorus-containing flame retardants to achieve Class I or Class II ratings.

DETAILED DESCRIPTION OF THE INVENTION

The halogenated hydroxyl-containing derivatives of pentaerythritol suitable for use in the present invention include 2,2-bis(bromomethyl)1,3-dihydroxy-propane, commonly known as dibromoneopentyl glycol ("DBNPG"), 3-bromo-2,2-bis(bromomethyl)propanol, commonly known as tribromoneopentyl alcohol ("TBNPA"), 2-bromomethyl-2-hydroxymethyl-1,3-propanediol, mixtures thereof, and the corresponding chlorinated compounds. It is preferred to employ brominated derivatives of pentaerythritol, and mixtures of these compounds are preferred, such as the mixture available from The Dow Chemical Company under the trade name FR-1138. The halogenated hydroxyl-containing derivative of pentaerythritol is employed in an amount sufficient to impart flame retardance to a rigid polyurethane-containing foam to such a degree that said foam can achieve a Class I or Class II rating according to the ASTM E-84 test. Brominated hydroxyl-containing derivatives of pentaerythritol typically contain from about 40 to about 74 weight percent bromine, preferably contain from about 45 to about 70 weight percent bromine, and most preferably contain from about 55 to about 65 weight percent bromine. Preferably, from about 1.7 to about 11.7 weight parts of the brominated derivative of pentaerythritol are employed per 100 weight parts of foam, i.e., the foam will contain from about 1 to about 7 weight percent bromine.

The halogenated hydroxyl-containing derivative of pentaerythritol advantageously is employed together with a sucrose polyol. For the purposes of the present invention, the term "sucrose polyol" means at least one polyether polyol initiated on sucrose or a mixture of active-hydrogen-containing compounds comprising sucrose. The sucrose polyol provides a relatively high hydroxyl functionality which increases the crosslink density of the foam. This, coupled with the tendency of sucrose polyols to char during burning, enables greater flame retardant efficiency in the polyol compositions of the present invention.

The sucrose polyol is formed by reacting an alkylene oxide or a mixture of alkylene oxides with an active-hydrogen-containing initiator compound. Propylene oxide is the preferred alkylene oxide. Typical active-hydrogen-containing initiator compounds include polyhydroxy compounds, such as sucrose and glycerin, and amines. It is preferred to employ a mixture of glycerin and sucrose as the initiator. From about zero to about 50 weight parts of sucrose are employed per weight part of glycerin in the preferred sucrose polyols. Most preferably, from about 1 to about 20 weight parts of sucrose are employed per weight part of glycerin. The sucrose polyol typically has a hydroxyl equivalent weight of from about 90 to about 250; preferably the equivalent weight ranges from about 110 to about 160. Typically, from about 4 to about 32 weight parts of sucrose polyol are employed per 100 weight parts of foam.

The sucrose polyol and the halogenated hydroxyl-containing derivative of pentaerythritol can be admixed to form an inexpensive, low viscosity flame retardant polyol composition. Typically, the viscosity of such a composition has a viscosity which is less than about 50,000 centipoises (50 Pa·s) at 25° C. Preferably, the viscosity of such a composition is less than about 15,000 centipoises (15 Pa·s) at 25° C.

As the aromatic polyester polyol of the present invention, any aromatic polyester may be used and may contain either terminal hydroxyl or terminal carboxyl groups depending upon the proportion of the polyhydric alcohol and polycarboxylic acid used in their preparation. The polyesters may also contain hetero atoms or double bonds, or both, as well as saturated or unsaturated fatty acids or fatty alcohols as modifying components. Any suitable polyhydric alcohol may be used in making polyesters such as, for example, ethylene glycol, 1,3-propylene glycol, 1,3-butylene glycol, trimethylol propane, glycerin, pentaerythritol, N,N'-tetrakis(2-hydroxypropyl) ethylene diamine, 1,6-hexanediol, 1,5-amylene glycol, dihydroxyethyl hydroquinone, dihydroxyethyl-1,5-dihydroxy naphthalene and the like. In making polyesters, any suitable aromatic polycarboxylic acid may be used, such as, for example, phthalic acid, terephthalic acid, 1,2,4-benzene tricarboxylic acid, and mixtures thereof. The term, polyester, of course, includes polyesteramides which are prepared by incorporating an amino compound into the reaction mixture for the preparation of polyesters. Any suitable amino compound may be used such as, for example, ethylene diamine, p-amino aniline, toluene diamine, propylene diamine, ethanolamine, 3-amino propanol, amino butanol, 2-amino hexanol and the like. Preferred polyester polyols are formed using low molecular weight diols, such as ethylene glycol and diethylene glycol, i.e., it is preferred to employ polyester polyols having high aromatic character. The aromatic polyester polyols are prepared using methods known in the art.

Advantageously, the polyester polyol is employed as a blend with the sucrose polyol and the halogenated hydroxyl-containing derivative of pentaerythritol in the preparation of rigid polyurethane-containing foams. Class I foams, i.e., foams which can receive a Class I rating according to the requirements of the ASTM E-84 test, or Class II foams can be prepared using the polyol blend of the present invention. Class I rigid foams must achieve a flame spread rating of less than or equal to 25 and a smoke generation rating of less than or equal to 450. Class II rigid foams must achieve a flame spread rating of less than or equal to 75 and a smoke generation rating of less than or equal to 450. Typically, the polyol blend is at least about 10 weight percent polyester polyol. Preferably, the polyester polyol is employed in an amount which is from about 20 to about 60 weight percent of the total polyol blend of sucrose polyol, polyester polyol, and halogenated hydroxyl-containing derivative of pentaerythritol.

The novel polyol compositions of the invention are useful as intermediates in the preparation of polyurethanes in accordance with procedures known in the art, and are distinguished from polyols hitherto prepared by the improved flame retardant properties imparted to the resulting polymers without loss of desirable physical properties. Preferred novel polyol compositions can be prepared by admixing from about 20 to about 80 weight percent of a sucrose polyol, from about 20 to about 60 weight percent of an aromatic polyester polyol, and from about 2 to about 30 weight percent of a halogenated, hydroxyl-containing derivative of pentaerythritol, the percentages being based upon the total weight of the resulting admixture of these three components.

In preparing polyurethanes from the polyol composition of the invention, the procedures well-known in the art for the preparation of polyurethanes are employed, the polyol composition of the invention being used to replace a part or the whole of the polyol components employed in the procedures known in the art. While the polyol composition of the invention can be applied to the formation of any type of polyurethane or polyurethane-modified polyisocyanurate, including cellular and non-cellular polymers, they are of particular application in the preparation of rigid cellular products. Accordingly, the use of the polyol composition of the invention will be illustrated by reference to the preparation of rigid cellular products, but it is to be understood that the invention is not limited thereto but is of general application to the preparation of polyurethanes and polyurethane-modified polyisocyanurates of all types. Preferably, polyurethane-modified polyisocyanurates foams of the present invention have a maximum isocyanate index of about 250; most preferably, they have a maximum isocyanate index of about 200.

The various methods for the preparation of polyurethane-containing foams are well-known. For a reference to said methods and to various catalysts, blowing agents, surfactants, other additives, and polyisocyanates, see U.S. Pat. No. 4,209,609 and the references cited therein; said references and the teachings of U.S. Pat. No. 4,209,609 are hereby incorporated herein by reference.

The polyol composition of the present invention can be employed, without phosphorus-containing compounds, in the preparation of Class I and Class II rigid polyureethane-containing foams. Nevertheless, it is preferred to exclude phosphorus in any form from the polyol composition of the present invention.

In polyol compositions which contain a relatively high amount of polyester polyol, i.e., greater than or equal to about 30 weight percent polyester polyol based on the total weight of sucrose polyol, polyester polyol, and halogenated derivative of pentaerythritol, it can be desirable to employ a solubilizing agent in order to make the polyester polyol more compatible with the polyol composition. The solubilizing agent typically is employed in small amounts which are sufficient to maintain the polyol composition as a liquid at room temperature. Preferred solubilizing agents include, for example, alkoxylates, especially ethoxylates, of nonyl phenol. It is possible to employ certain phosphorus-containing compounds as the solubilizing agent. Tris-2-chloropropyl phosphate is an example of a suitable phosphorus-containing solubilizing agent.

The organic polyisocyanates and polyisothiocyanates that are useful in producing the polymers of this invention are aromatic organic compounds that contain at least two isocyanato or isothiocyanato groups. Such compounds are well-known in the art of producing polyurethanes, polyurethane-modified polyisocyanurates, and the related sulfur-containing polymers. Examples of suitable aromatic organic polyisocyanates include polymeric and non-polymeric toluene diisocyanates, and polymeric and non-polymeric methylene diphenylene diisocyanates. Polymeric toluene diisocyanate and polymeric methylene diphenylene diisocyanate are the preferred isocyanates for the polyurethanes of the present invention, with polymeric methylene diphenylene diisocyanate being preferred for the preparation of polyurethane-modified polyisocyanurate foams.

SPECIFIC EMBODIMENTS

The following preparations and examples are given to illustrate the invention and should not be construed as limiting its scope. All parts and percentages are by weight unless otherwise indicated.

EXAMPLE 1

PREPARATION OF FLAME RETARDANT POLYOL

A flame-retardant polyol is prepared by blending 30 parts of a mixture of brominated hydroxyl-containing derivatives of pentaerythritol, which mixture is available from The Dow Chemical Company as FR-1138, and 70 parts of a sucrose polyol, which is available from The Dow Chemical Company as VORANOL ® 446. VORANOL ® 446 is a polypropylene oxide polyol initiated on a mixture of sucrose and glycerin. VORANOL ® 446 has an average hydroxyl functionality of 5, an equivalent weight of 125, and a viscosity of approximately 8,000 centipoises at 77° F. (25° C.). The resulting yellow liquid has a Brookfield viscosity of approximately 12,000 centipoises at 22° C., a hydroxyl equivalent weight of approximately 130, and contains about 18 weight percent bromine.

EXAMPLES 2–4

PREPARATION OF RIGID POLYURETHANE FOAMS

The flame retardant polyol composition of Example 1 is employed in the preparation of several rigid polyurethane foams. The formulations of the foams are summarized in Table I:

TABLE I

| Component | Formulation (in parts) | | |
|---|---|---|---|
| | Ex. 2 | Ex. 3 | Ex. 4 |
| Flame Retardant Polyol of Example 1 | 80 | 67 | 27 |
| Additional VORANOL ® 446 | — | 3 | 43 |
| Terate 203[1] | 20 | 30 | 30 |
| DC 193[2] | 3.0 | 3.0 | 3.0 |
| Dabco R-8020[3] | 1.5 | 1.5 | 1.5 |
| R-11[4] | 45 | 45 | 45 |

TABLE I-continued

| Component | Formulation (in parts) | | |
|---|---|---|---|
| | Ex. 2 | Ex. 3 | Ex. 4 |
| Polymeric MDI[5] | 106.3 | 103.3 | 105.1 |

[1]Terate 203 is a low molecular weight aromatic polyester-containing polyol derived from dimethyl terephthalic acid residues and is available from Hercules Corporation.
[2]DC 193 is a commercial silicone surfactant available from Dow Corning Corporation.
[3]Dabco R-8020 is a catalytic solution of triethylenediamine in trimethylethanol amine available from Air Products and Chemicals, Inc.
[4]R-11 is a $CCl_3F$-type blowing agent, which optionally includes a free radical scavenger, and is available from E. I. duPont de Nemours & Co.
[5]The polymeric methylene diphenylene diisocyanate employed is a multifunctional polyisocyanate having an isocyanate functionality of about 2.7. Polymeric methylene diphenylene diisocyanate is commercially available from several sources including, e.g., The Upjohn Company under the brand name PAPI 135, and Rubicon Chemical under the brand name Rubinate M.

For each formulation all of the components, except for the polymeric methylene diphenylene diisocyanate, are blended together to form a mixture; the mixture will hereinafter be referred to as the "B-side". Similarly, the polymeric methylene diphenylene diisocyanate will be referred to as the "A-side". The A-side and B-side are fed simultaneously at 70° F. to a high pressure mixing head at a rate of 90 lb./min. The mixing head mixes the A-side and B-side and the resulting mixture is poured into an aluminum mold having a temperature of approximately 110° F., and dimensions of 9 feet by 28 inches by 4 inches. The processing conditions and the physical properties of the mixtures and the resulting foams are summarized in Table II.

In the following table(s), "n.m." indicates that no measurement is taken.

TABLE II

| | Formulation | | |
|---|---|---|---|
| | Ex. 2 | Ex. 3 | Ex. 4 |
| Run Conditions | | | |
| NCO Index | 110 | 110 | 110 |
| A-side/B-side mix (weight ratio) | 0.71 | 0.69 | 0.70 |
| B-side viscosity @25° C. (centipoises) | 350 | n. m. | 400 |
| In-Mold Cure Temperature (°F.) | 110 | 110 | 110 |
| Cure Time (minutes) | 15 | 15 | 15 |
| Reaction Profile (given in seconds) | | | |
| Cream time | 12 | 11 | 15 |
| Gel Time | 50 | 50 | 50 |
| Tack Free Time | 120 | 80 | 135 |
| Foam Physical Properties | | | |
| Foam Core Density (lb./ft.³) ASTM 1622-70 | 1.81 | 1.83 | 1.84 |
| K-factor ASTM C-177-45 | 0.127 | 0.121 | 0.131 |
| Original Dimensional Stability (% after 14 days @ 100% relative humidity and 158° F.) | 16 | 15 | 11 |
| Abrasion, percent weight loss/minute ASTM C-421-61 | 0.4 | 0.6 | 0.6 |
| Compressive Strength, PSI ASTM D1621-64 | | | |
| parallel | 19 | 24 | 20 |
| perpendicular | 15 | 14 | 16 |
| Tunnel Test (4 inch thickness)[1] ASTM E-84 | | | |

TABLE II-continued

|  | Formulation | | |
|---|---|---|---|
|  | Ex. 2 | Ex. 3 | Ex. 4 |
| Flame Spread | 23 | 23 | 36 |
| Smoke | 263 | 242 | 260 |

[1]The contents of this document are not intended to reflect hazards presented by any materials under actual fire conditions.

EXAMPLE 5

A flame retardant polyol is prepared using the method of Example 1, except that 40 parts of FR-1138 and 60 parts of VORANOL ® 446 are employed.

EXAMPLE 6

A flame retardant polyol is prepared using the method of Example 1, except that the sucrose polyol is VORANOL ® 490. VORANOL ® 490 is a polypropylene oxide polyol which is initiated on a mixture of sucrose and glycerin, and which has an average functionality of 4, an equivalent weight of 114, and a viscosity of approximately 5,600 centipoises at 77° F.

EXAMPLE 7

A flame retardant polyol is prepared using the method of Example 1, except that the sucrose polyol is VORANOL ® 370. VORANOL ® 370 is a polypropylene oxide polyol which is initiated on a mixture of sucrose and glycerin, and which has an average functionality of 7, an equivalent weight of 151, and a viscosity of approximately 23,000 centipoises at 77° F.

EXAMPLES 8-12

Foams are prepared according to the method employed to prepare the foams of Examples 2–4, except that the formulations are different. The formulations and the properties of the corresponding foam are presented in Table III.

TABLE III

| Component | Formulation (in parts) | | | | |
|---|---|---|---|---|---|
|  | Ex. 8 | Ex. 9 | Ex. 10 | Ex. 11 | Ex. 12 |
| Flame Retardant Polyol of Example 1 | 13 | — | — | — | — |
| (Additional) VORANOL ® 446 | 57 | — | 10 | — | — |
| Polyol of Ex. 5 | — | — | 60 | 60 | — |
| Polyol of Ex. 6 | — | 80 | — | — | — |
| Polyol of Ex. 7 | — | — | — | — | 70 |
| Terate 203 | 30 | 20 | 30 | 40 | 30 |
| DC 193 | 2 | 3.0 | 3.0 | 3.0 | 2.0 |
| Polycat ® 8[1] | 1.1 | — | — | — | 0.7 |
| Dabco R-8020 | — | 1.5 | 1.5 | 1.5 | — |
| R-11 | 39.7 | 45 | 45 | 45 | 37.3 |
| Polymeric MDI | 104.4 | 115.4 | 105.8 | 100.5 | 92.7 |
| A/B Ratio | 0.73 | 0.77 | — | — | 0.66 |
| NCO Index | 110 | 110 | 110 | 110 | 110 |
| Mold Temp. (°F.) | 110 | 110 | 110 | 110 | 110 |
| Cure Time (min.) | 15 | 15 | 15 | 15 | 15 |
| Reaction Profile (Sec.) | | | | | |
| Cream | 10 | 12 | 10 | 10 | 20 |
| Gel | 70 | 55 | 55 | 45 | 75 |
| Tack Free | 165 | 110 | 85 | 70 | 150 |
| Density (lb/ft$^3$) (core foam) | 1.80 | 1.85 | 1.83 | 1.90 | 1.80 |
| Tunnel Test (4 in. foam) | | | | | |
| Flame Spread | 43 | 25 | 23 | 20 | 23 |
| Smoke | 219 | 378 | 184 | 156 | 256 |

[1]Polycat ® 8 is dimethyl cyclohexylamine sold by Abbott Laboratories

Examples 2–4 and 8–12 illustrate polyurethane rigid foams prepared using flame retardant polyols of the present invention. These foams exhibit low smoke emission, good results in simulated flammability tests, and good physical properties.

As previously mentioned, the preceding examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A flame-retardant composition comprising:
   (a) a sucrose polyol;
   (b) an aromatic polyester polyol; and
   (c) an amount of a halogenated, hydroxyl-containing derivative of pentaerythritol which is sufficient to impart a degree of flame retardancy to a rigid polyurethane foam prepared using said composition, such that the polyurethane can achieve a Class I or Class II rating according to the ASTM E-84 test.

2. A composition of claim 1 comprising: from about 20 to about 80 weight percent of component (a); from about 20 to about 60 weight percent of component (b); and from about 2 to about 30 weight percent of component (c), based on the total weight of components (a), (b) and (c).

3. A composition of claim 1 wherein the bromine content is from about 1 to about 20 weight percent.

4. A composition of claim 1 which, when employed in the preparation of a rigid polyurethane foam, enables said foam to achieve a Class I rating.

5. A composition of claim 1 wherein the sucrose polyol has a hydroxyl equivalent weight of from about 110 to about 160.

6. A flame-retardant polyurethane rigid foam composition comprising the reaction product of:
   (a) at least one polyfunctional aromatic organic isocyanate; and
   (b) a composition of claim 1.

7. A composition of claim 6 wherein the polyester polyol is at least 20 weight percent of the polyol component.

8. A composition of claim 6 wherein the brominated, hydroxyl-containing pentaerythritol is at most about 60 percent of the polyol component, excluding the polyester polyol.

9. A composition of claim 6 wherein the bromine content is from about 1 to about 7 weight percent.

10. A composition of claim 6 which achieves a Class I or Class II rating in the ASTM E-84 test.

11. A composition of claim 7 which achieves a Class I rating in the ASTM E-84 test.

12. A composition of claim 9 further comprising a halogenated blowing agent.

13. A composition of claim 1 which is substantially free of phosphorus in any form.

14. A composition of claim 4 which is substantially free of phosphorus in any form.

15. A composition of claim 1 further comprising a halogenated blowing agent, a catalyst, and a surfactant.

16. A composition of claim 1 wherein the derivative of pentaerythritol is mostly DBNPG.

17. A composition of claim 1 wherein the derivative of pentaerythritol is mostly TBNPA.

18. A composition of claim 1 wherein component (c) is a brominated, hydroxy-containing derivative of pentaerythritol.

* * * * *